Sept. 14, 1965

J. R. THOMAS 3,205,999

STENCIL CONVEYOR

Filed Sept. 19, 1963

INVENTOR.
James R. Thomas
BY Snow and Benno
Attys.

Sept. 14, 1965    J. R. THOMAS    3,205,999
STENCIL CONVEYOR
Filed Sept. 19, 1963    2 Sheets-Sheet 2

INVENTOR.
James R. Thomas
BY Snow and Benno
Attys

United States Patent Office 3,205,999
Patented Sept. 14, 1965

3,205,999
STENCIL CONVEYOR
James R. Thomas, Prospect Heights, Ill., assignor to Weber Marking Systems, Inc., a corporation of Illinois
Filed Sept. 19, 1963, Ser. No. 310,065
4 Claims. (Cl. 198—1)

This invention relates to a new and improved stencil conveyor.

More particularly the stencil conveyor of this invention is utilized in the apparatus for feeding and applying stencils as shown in Patent 3,052,284. The stencil tabbing machine of the prior patent must separately feed fragile stencils to a particular position relative to a business form. It is with reference to the stencil feeding conveyor that the present invention is primarily concerned.

An important object of this invention is to provide a conveyor for thin, tissue stencils which will securely hold the stencils and accurately move them to a desired position and then be readily capable of releasing the stencils.

Another important object of this invention is the provision of a stencil conveyor including a plurality of laterally spaced apart belts together forming a surface on which stencils may ride and having a suction means beneath the belts to cause the stencils to adhere to the belts as the belts move to convey the stencils.

Another important object of this invention is to supply a conveyor of stencils with means for overcoming electrostatic adherence of the stencils to surrounding objects.

Still another important object of this invention is to equip a stencil tabbing machine apertured conveyor with an enclosure therebeneath and suction means associated with the enclosure to cause the stencils to adhere to and move with the apertured conveyor.

An object as set forth in the preceding paragraph in which there is included a means for adjusting the degree of suction applied to the enclosure.

Other and further important objects and advantages will become apparent from the disclosures in the following specification and accompanying drawings.

Figure 1:
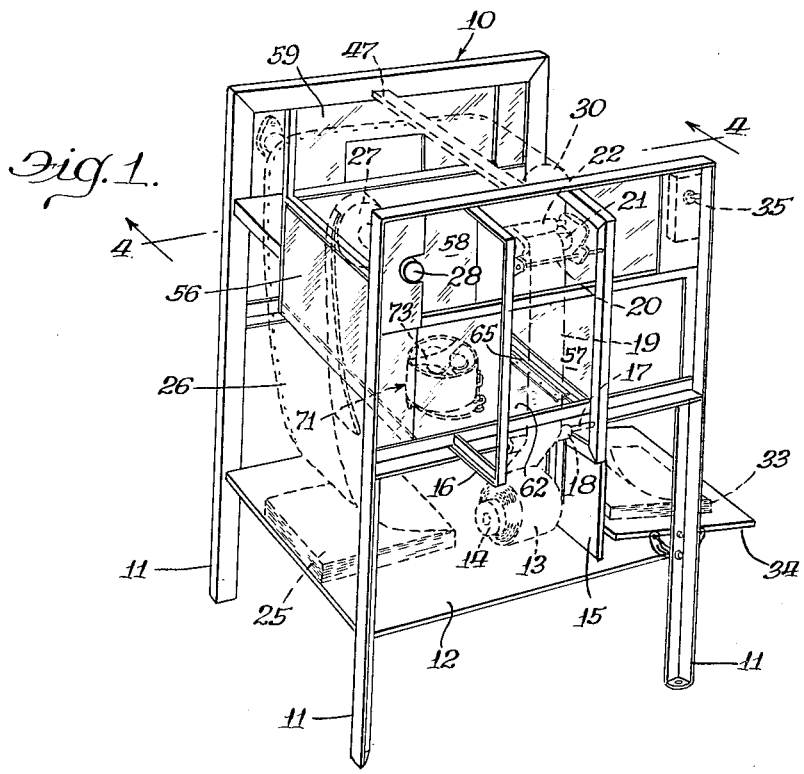
FIGURE 1 is a perspective view of a stencil applicator employing the stencil conveyor of this invention.

The reference numeral 10 indicates generally a frame supporting structure for the stencil applying machine on which the stencil conveyor of this invention forms an integral part. The rectangularly shaped frame includes legs 11 at each corner thereof. A lower shelf 12 is provided on the frame 10 to carry a supply of business forms to be stencil tabbed. A roll of stencil material 13 is carried on a spool 14 which in turn is mounted on the frame 10. A vertically disposed member 15 forms a part of the frame structure 10 and is used to journally support the spool 14. A second frame member 16 is vertically disposed and spaced from the member 15. A first shaft 17 is mounted between the members 15 and 16 above the spool 14. A small diameter roller 18 is journaled on the shaft 17 and acts as a roller guide for a strip of stencil material 19 from the supply 13 as it is moved upwardly to the work plane of the applicator where the stencils are attached to the business forms. A second shaft 20 is carried between the vertical supporting members 15 and 16 at a position spaced above the first named shaft 17. A roller 21 is journaled between the members 15 and 16 at a position above and inwardly of the second shaft 20. A guide roller 22 is journaled between the members 15 and 16 slightly above and inwardly of the roller 21. The strip of stencil material 19 runs from the supply 13 on the spool 14 over the roller 18 on the first shaft, under the second shaft 20, over the roller 21 and under the guide roller 22 where it is delivered to the stencil applying plane of the applicator.

A supply of continuous interleaved business forms 25 is mounted on the lower shelf 12. A strip 26 of the forms 25 extends upwardly and is supported over a roller 27 adjacent the top of the frame 10. The roller 27 is carried on a shaft 28 which in turn is supported between the sides of the frame supporting structure 10. A spaced apart parallel shaft 29 is carried in the frame 10 near the other end thereof. A roller 30 carried on the shaft 29 acts in cooperation with the roller 27 to guide and support the business forms in a generally horizontal plane at the top of the frame 10. This is the same plane in which the stencils from the strip 19 are cut into desired lengths and carried on the conveyor of this invention for adherence to the business forms as the business forms intersect the path of the stencils. The details of the stencil cutting and the drive mechanisms are shown more particularly in the prior Weber et al. Patent 3,052,284. A sprocket 31 is provided on the roller 30 and is used to engage the side punched business forms 25 and positively advance the forms when the roller 30 is driven. The rollers 27 and 30 hold the business forms in a horizontal 32. It is while the forms move in this horizontal run 32 that the stencils are tabbed to them in a precise position. The stencil tabbed forms are then moved down the far end of the machine and deposited in a pile 33 on a receiving table 34. The table 34 is arcuately adjustable as shown in the prior Patent 3,052,284.

An electric switch 35 is provided on the frame supporting structure 10 to operate suitable motors (not shown) to move the stencils and the business forms. Here again these drive mechanisms have not been shown in this application because they do not form a direct part of the present invention, but they are shown in my prior Patent 3,052,284.

Figure 3:
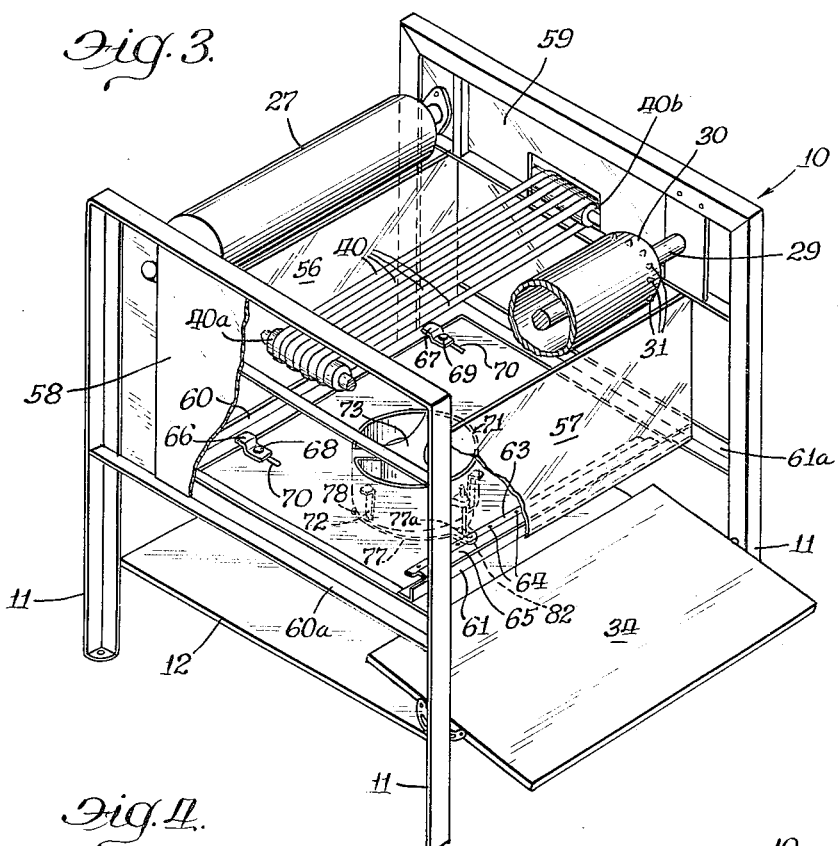
FIGURE 3 is a perspective view of the stencil applicator with parts removed to show the environment of the suction fan and enclosure.

The stencil conveyor of this invention concerns the transportation of stencils transversely of the movement of business forms to a position of intersection with the business forms where the stencils are tabbed to the forms. The conveyor includes an endless apertured belt which in the present instance is made up of a plurality of spaced apart endless belts 40. The endless belts 40 are extended between spaced apart end rollers or pulleys 40a and 40b which are shown in FIGURE 3. The mounting and the driving means for the rollers is shown in detail in my prior Patent 3,052,284. A stencil raiser 41 has spaced elements disposed between the plural belts 40. The spaced apart belts in effect form an apertured belt, the top surface of which is used to carry the stencils. A downwardly depending operating member 42 from the stencil raiser 41 is provided with a roller 43 at the bottom thereof. A cam 44 is mounted on a shaft 45 which in turn is carried for rotation within the frame supporting structure 10. The shaft 45 is rotatably driven to cause the cam 44 to engage the roller 43 and effect a raising or a lowering of the raiser member 41.

Figure 4:
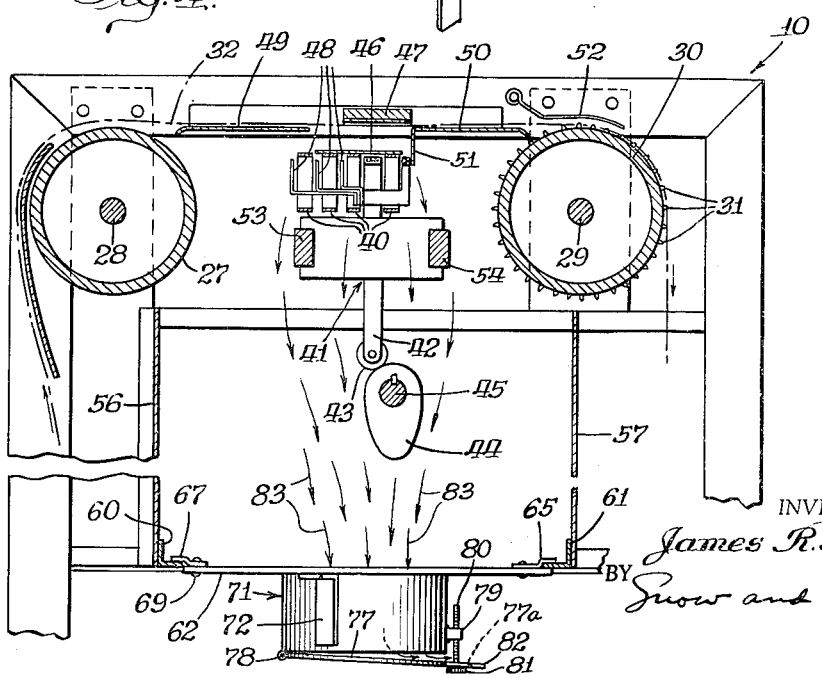
FIGURE 4 is a sectional view taken on the line 4—4 of FIGURE 1.

As best shown in FIGURE 4 a cut stencil 46 is shown riding on the top surface of the belts 40. The stencils are cut from the strip of stencil material 19 after the strip passes between the rollers 21 and 22 as shown in my prior Patent 3,052,284.

The pressing of the cut stencils against the business forms is accomplished by the presser member 41 moving upwardly against a back-up bar 47 which is carried on the frame supporting structure 10. The upper end of the presser member shown at 48 includes spaced finger-like members disposed between the laterally spaced belts 40 to engage and press upwardly against the stencil 46 with the back-up bar 47 acting as a reacting member enabling the application of suitable pressure on the stencils against the business forms.

The plane of stencil application through which the business forms run in the horizontal path 32 is further defined by spaced apart top members 49 and 50. The strip of forms 26 leaves the roller 27 and passes onto the top member 49. The spaced apart top member 50 receives the strip 26 after the point of stencil application. The path of the stencils and the stencil presser member is positioned between the spaced top members 49 and 50. The top members 49 and 50 are supported on the frame structure 10. The top member 50 is provided with a downwardly projecting flange 51 to guide the transverse movement of the cut stencils 46. After leaving the top 50 the combination business forms and stencils pass over the roller 30 and thence downwardly for deposit in a fanfolding pattern in the stack 33 on the receiving table 34. A hold down spring 52 presses downwardly over the sprocket teeth 31. This insures the positive drive of the completed business forms by the engagement of the margin openings with the sprocket teeth 31.

The stencil raiser 41 is adjustably mounted on spaced apart rail members 53 and 54. The rail members are fixedly carried in the frame structure 10. Adjustment of the raiser 41 along the rail members permits the stencil to be raised and pressed against any portion of the business form.

The stencil conveyor of this invention comprises the spaced belts on which the stencils ride in their movement to intersect the path of movement of the business forms. The conveyor further includes a chamber 55 beneath the central portion of the top between the spaced rollers 27 and 30 and under the stencil carrying belts 40. The chamber 55 is defined by spaced apart fore and aft end walls 56 and 57 and spaced apart side panels 58 and 59. Together these ends and sides provide an enclosure for all four sides of the chamber 55. The lower edges of the end walls 56 and 57 are provided with inwardly facing angle members 60 and 61. These angle members abut and are welded or otherwise fastened to parallel frame members 60a and 61a which extend fore and aft between the leg members 11. A bottom 62 is provided for the chamber 55 and is carried on the spaced apart angle members 60 and 61.

Figure 2:
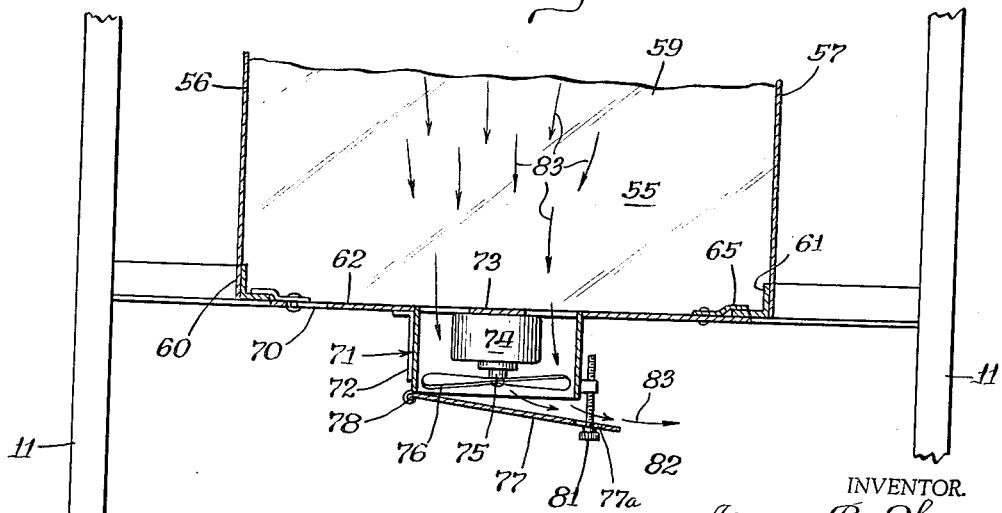
FIGURE 2 is a detail sectional view of the suction producing mechanism in the stencil applicator of FIGURE 1.

A long clip 63 is riveted or otherwise fastened at 64 along the rearward edge of the bottom plate 62. The clip is equipped with a rearwardly extending lip 65 which overlies the lower horizontal ledge of the angle member 61 as best shown in FIGURES 2 and 4. The rear edge of the bottom plate 62 is disposed beneath the horizontal ledge of the angle member 61 and thus the bottom plate is held against relative vertical movement with the angle member 61.

Short clips 66 and 67 are disposed in spaced apart positions along the front edge of the bottom plate 62. Rivets 68 and 69 loosely join the clips 66 and 67 respectively to the top of the plate 62. Elongated slots 70 are provided in the plate 62 to permit passage of the rivets 68 and 69. The clips 66 and 67 may be slid rearwardly in the slots 70 to permit assembly of the plate 62 to the lower horizontal ledge of the angle member 60. The assembly of the bottom plate 62 to the chamber 55 is accomplished by tilting the plate to slide the rear end thereof onto the angle 61. As the forward edge of the plate 62 is raised the clips 66 and 67 are retracted within the elongated slots 70. When the plate is in position in alignment with the angle member 60 the clips 66 and 67 are extended to a position of overlap of the lower horizontal ledge of the angle 60.

A tubular housing 71 depends downwardly from the bottom plate 62. Several angle brackets 72 are welded or otherwise attached to the underside of the bottom plate 62 and abut the side of the tubular housing 71 to give it rigid support. The bottom plate 62 is cut out within the tubular housing 71 leaving only a spider-like member 73 to carry a motor 74. The motor is supported centrally of the spider and thus also centrally of the tubular housing 71. The motor 74 has a driven shaft 75 disposed generally vertically and projecting downwardly into the tubular housing 71. A fan 76 is mounted on the lower end of the motor shaft 75 within the confines of the tubular housing 71. When the motor is supplied with electromotive force the fan 76 acts to draw air downwardly through the chamber 55. The only opening to the chamber is at its top at the position of the apertured belt conveyor for stencils. Thus there is provided a suction on the stencil conveyor which acts to hold the stencil in position on the multi-strip belt and insures that the stencil moves with the belt to its position of attachment to an intersecting business form.

A cover is provided for the bottom of the tubular housing 71 to control the degree of suction to be applied to the stencil conveyor. The cover is hinged at 78 on one side thereof to the lower edge of the tubular housing 71. A threaded sleeve 79 is affixed to one of the angle brackets 72 at a location on the opposite side of the hinge 78. A threaded bolt 80 having an enlarged knurled head 81 as a hand engaging member is adapted to pass through an elongated slot 77a in a projecting portion 82 of the cover 78. As the bolt 80 is threadedly engaged with the fixed sleeve 79 and drawn upwardly therein the cover 78 is moved to a more fully housing closing position. The head 81 of the bolt 80 has a diameter greater than the width of the elongated slot 77a and thus the cover position is controlled by the position of the knurled head 81. It is apparent therefore that greater or less effective suction may be applied to the stencil conveyor of this invention by merely moving the cover about its hinge 78 by more or less threaded engagement of the bolt 80 with the threaded sleeve 79. For convenience the direction of air currents are shown by the arrows 83 moving downwardly through the chamber 55 and out the bottom opening as determined by the angular position of the cover 77.

The many parts of the stencil tabbing machine tend to become electrostatically charged in various atmospheric conditions. At these times the thin fragile stencils are attracted to and even pulled to these parts. Thus notwithsanding the multi-strip endless belt conveyor attempting to move the cut stencils to a position of desired attachment to the business forms the stencils might have been attracted to or pulled to an adjacent electrostatically charged part. However, with the suction device of this invention complementing the slatted belt conveyor the stencils may be firmly held to the conveyor until they are desired to be released. The suction thus overcomes any tendency for the stencil to move anywhere but the desired path of travel. The suction is controlled to overcome any external pulling forces that may be applied to the stencils. This insures proper alignment of the stencils with the business forms. Misalignment of stencils is completely obviated.

I am aware that numerous details of construction may be varied throughout a wide range without departing from the principles disclosed herein and I therefore do not propose limiting the patent granted hereon otherwise than as necessitated by the appended claims.

What is claimed is:

1. In a machine for applying individual stencils to a series of forms including a stencil conveyor comprising a multi-strip endless belt in which the strips are laterally spaced apart to form open slots therebetween, an enclosed open top chamber formed in said machine beneath said multi-strip endless belt, an exhaust fan and housing formed in the bottom of said chamber whereby a suction is provided on said multi-strip endless belt to firmly hold stencils to said belt during movement of said belt by drawing air downwardly through the open slots, whereby the stencils may be accurately placed on each form.

2. A device as set forth in claim 1 in which said exhaust fan housing is equipped with an adjustably openable under cover.

3. A device as set forth in claim 1 in which said chamber has means for removably attaching its bottom from and to said machine.

4. A machine for accurately applying stencil assemblies to a continuous series of business forms comprising, feeding means for feeding a continuous series of business forms horizontally in one direction through a certain area, a plurality of endless belts carried in a horizontally spaced apart relationship for rotation about a pair of horizontally spaced apart rollers, said rollers being positioned so that both flights of each belt are positioned below the plane of said certain area and so that said belts move in a direction perpendicular to the direction of movement of said business forms, a plurality of separate stencil assemblies carried on the upper flights of said belts and beneath said certain area of said business forms, means carried beneath said belts for passing upwardly between the lower and upper flights of said belts for lifting said stencil assemblies from said belts and into contact with the underside of said business forms, wall means enclosing said last mentioned means, said rollers and said belts and extending upwardly at least to said certain area, fan means in the underside of said wall means for causing a downward air flow against said stencil assemblies and through said belts so that said stencil assemblies are effectively retained against said belts while said belts are rotated, said wall means and said fan means further being formed so that said business forms escape any substantial downward draw out of the plane of said certain area.

References Cited by the Examiner

UNITED STATES PATENTS

| | | | |
|---|---|---|---|
| 1,377,136 | 5/21 | Lawrence et al. | |
| 2,362,168 | 11/44 | Stokes | 198—184 X |
| 2,462,439 | 2/49 | Thompson | 271—74 X |
| 2,467,241 | 4/49 | Streich | 271—74 X |
| 2,895,552 | 7/59 | Pomper et al. | 198—184 X |
| 3,052,284 | 9/62 | Weber et al. | 156—542 |
| 3,084,491 | 4/63 | Solomon | 271—74 X |

SAMUEL F. COLEMAN, *Primary Examiner.*